United States Patent
Krutskevych

(10) Patent No.: US 10,940,351 B2
(45) Date of Patent: Mar. 9, 2021

(54) FIRE SPRINKLER SYSTEM

(71) Applicant: Marioff Corporation Oy, Vantaa (FI)

(72) Inventor: Nazar Krutskevych, Pomorske (PL)

(73) Assignee: MARIOFF CORPORATION OY, Vantaa (FI)

(*) Notice: Subject to any disclaimer, the term of this patent is extended or adjusted under 35 U.S.C. 154(b) by 48 days.

(21) Appl. No.: 16/256,240

(22) Filed: Jan. 24, 2019

(65) Prior Publication Data
US 2019/0224515 A1 Jul. 25, 2019

(30) Foreign Application Priority Data

Jan. 24, 2018 (EP) .................................... 18397504

(51) Int. Cl.
| A62C 37/50 | (2006.01) |
| G01F 1/66 | (2006.01) |
| A62C 35/68 | (2006.01) |
| A62C 35/60 | (2006.01) |
| G01M 3/24 | (2006.01) |

(52) U.S. Cl.
CPC ............ A62C 37/50 (2013.01); A62C 35/605 (2013.01); A62C 35/68 (2013.01); G01F 1/66 (2013.01); G01M 3/243 (2013.01)

(58) Field of Classification Search
CPC ....... A62C 35/605; A62C 35/68; A62C 37/50; G01F 1/66; G01M 3/243
See application file for complete search history.

(56) References Cited

U.S. PATENT DOCUMENTS

| 3,473,612 A | 10/1969 | Poitras |
| 4,320,666 A | 3/1982 | Redding |
| 5,460,047 A | 10/1995 | Jacobson |
| 5,546,801 A | 8/1996 | Swinson et al. |
| 5,548,530 A * | 8/1996 | Baumoel ............... G01M 3/243 702/48 |
| 6,333,695 B2 | 12/2001 | Young |
| 6,950,768 B2 | 9/2005 | Freund, Jr. et al. |

(Continued)

FOREIGN PATENT DOCUMENTS

| CN | 203598403 U | 5/2014 |
| CN | 103071269 B | 11/2015 |

(Continued)

OTHER PUBLICATIONS

EP Extended European Search Report for Application No. 18397504; Report dated Jun. 19, 2018; 2 pages.

(Continued)

*Primary Examiner* — Darren W Gorman
(74) *Attorney, Agent, or Firm* — Cantor Colburn LLP

(57) ABSTRACT

A fire sprinkler system is provided. The fire system comprising: a sprinkler head configured to provide fire suppressant to an activation zone when the sprinkler head is activated; a pipe run fluidly connected to the sprinkler head and configured to provide fire suppressant to the sprinkler head; a first ultrasonic flow meter operably attached to the pipe run, the first ultrasonic flow meter being configured to detect a first flow rate of fire suppressant through the pipe run; and a monitoring system in electronic communication with the first ultrasonic flow meter and configured to receive the first flow from the first ultrasonic flow meter.

16 Claims, 3 Drawing Sheets

(56) References Cited

U.S. PATENT DOCUMENTS

| | | |
|---|---|---|
| 7,437,948 B2 | 10/2008 | Kishiro et al. |
| 7,469,599 B2 | 12/2008 | Froehlich et al. |
| 7,810,399 B2 | 10/2010 | Van Klooster et al. |
| 8,170,812 B2 | 5/2012 | Straub, Jr. |
| 8,489,342 B2 | 7/2013 | Dugger et al. |
| 8,700,344 B2 | 4/2014 | Wilson |
| 8,749,393 B1 * | 6/2014 | Tollefson ............ G01M 3/2876 340/605 |
| 8,850,871 B2 * | 10/2014 | Schaefer ............. G01M 3/2807 73/40.5 A |
| 2003/0167847 A1 * | 9/2003 | Brown .................. G01M 3/243 73/592 |
| 2006/0248961 A1 * | 11/2006 | Shachar ............. G01P 13/0033 73/861.24 |
| 2012/0090702 A1 | 4/2012 | Shalev |
| 2014/0305215 A1 | 10/2014 | Dabak et al. |
| 2016/0101306 A1 | 4/2016 | Hennegan |
| 2016/0219805 A1 | 8/2016 | Romney et al. |
| 2017/0102286 A1 * | 4/2017 | Inoue .................... G01M 3/243 |
| 2017/0307466 A1 * | 10/2017 | Brennan, Jr. ....... G01M 3/2807 |
| 2017/0322567 A1 | 11/2017 | Klein et al. |
| 2018/0214726 A1 * | 8/2018 | Nelson .................. A62C 35/68 |

FOREIGN PATENT DOCUMENTS

| | | |
|---|---|---|
| FR | 3050119 | 10/2017 |
| JP | 2015147003 A | 8/2015 |
| JP | 2015181630 A | 10/2015 |
| JP | 2016179034 A | 10/2016 |
| WO | 0046575 A1 | 8/2000 |

OTHER PUBLICATIONS

Machine Translation of Claims for Publication No. FR3050119; Dated Jun. 29, 2018; 3 Pages.

Machine Translation of Claims for Publication No. JP2015147003A; Dated Jun. 29, 2018; 2 Pages.

Machine Translation of Claims for Publication No. JP2015181630A; Dated Jun. 29, 2018; 2 Pages.

Machine Translation of Claims for Publication No. JP2015181630A; Dated Jun. 29, 2018; 9 Pages.

Machine Translation of Description for Publication No. FR3050119; Dated Jun. 29, 2018; 8 Pages.

Machine Translation of Description for Publication No. JP2015147003A; Dated Jun. 29, 2018; 8 Pages.

* cited by examiner

FIRE SPRINKLER SYSTEM

CROSS-REFERENCE TO RELATED APPLICATIONS

This application claims the benefit of European Application No. 18397504.4 filed Jan. 24, 2018, which is incorporated herein by reference in its entirety.

BACKGROUND

The subject matter disclosed herein generally relates to the field of fire sprinkler systems, and more specifically, an apparatus and method for detecting a flow rate of a fire suppressant within the fire sprinkler system.

Activation of a sprinkler head needs to be identified quickly to locate the potential fire. Further leaks in a fire sprinkler system also need to be identified quickly. Leaks in a fire sprinkler systems could cause frequent standby pumping, extra water consumption, and in some cases fault activation. Leakage identification is a very important functionality for fire sprinkler system that have big water distribution infrastructure, especially for safety critical applications like nuclear power plants, transportation system, oil plants, and gas plants.

BRIEF SUMMARY

According to one embodiment, a fire sprinkler system is provided. The fire system comprising: a sprinkler head configured to provide fire suppressant to an activation zone when the sprinkler head is activated; a pipe run fluidly connected to the sprinkler head and configured to provide fire suppressant to the sprinkler head; a first ultrasonic flow meter operably attached to the pipe run, the first ultrasonic flow meter being configured to detect a first flow rate of fire suppressant through the pipe run; and a monitoring system in electronic communication with the first ultrasonic flow meter and configured to receive the first flow from the first ultrasonic flow meter.

In addition to one or more of the features described above, or as an alternative, further embodiments may include that the pipe run further comprises a common pipe run and a branch pipe run fluidly connecting the sprinkler head to the common pipe run, and wherein the first ultrasonic flow meter is operably attached to the branch pipe run.

In addition to one or more of the features described above, or as an alternative, further embodiments may include that the monitoring system is configured to determine that the sprinkler head has been activated when the first flow rate is greater than zero.

In addition to one or more of the features described above, or as an alternative, further embodiments may include that the monitoring system is configured to activate an alarm when it is determined that the sprinkler head has been activated.

In addition to one or more of the features described above, or as an alternative, further embodiments may include that the alarm indicates a location of the activation zone of the sprinkler head.

In addition to one or more of the features described above, or as an alternative, further embodiments may include: a second ultrasonic flow meter operably attached to the pipe run down stream of the first ultrasonic flow meter, the second ultrasonic flow meter being configured to detect a second flow rate of the fire suppressant through the pipe run, wherein the monitoring system is configured to receive the second flow rate from the second ultrasonic flow meter.

In addition to one or more of the features described above, or as an alternative, further embodiments may include that the monitoring system is configured to determine that a leak has occurred in the pipe run between the first ultrasonic flow meter and the second ultrasonic flow meter when the first flow rate does not equal the second flow rate.

In addition to one or more of the features described above, or as an alternative, further embodiments may include that the monitoring system is configured to activate an alarm when it is determined that the leak has occurred.

In addition to one or more of the features described above, or as an alternative, further embodiments may include that the alarm indicates a location of the leak.

In addition to one or more of the features described above, or as an alternative, further embodiments may include that the monitoring system is configured to determine that the sprinkler head and any other sprinkler head in the fire sprinkler system has not been activated.

According to another embodiment, a method of monitoring a flow rate of fire suppressant in a fire sprinkler system is provided. The method comprising: providing fire suppressant to a sprinkler head through a pipe run, the sprinkler head being configured to provide fire suppressant to an activation zone when the sprinkler head is activated; detecting a first flow rate of fire suppressant through the pipe run using a first ultrasonic flow meter operably attached to the pipe run; and receiving, using a monitoring system, the first flow rate from the first ultrasonic flow meter.

In addition to one or more of the features described above, or as an alternative, further embodiments may include that the pipe run further comprises a common pipe run and a branch pipe run fluidly connecting the sprinkler head to the common pipe run, and wherein the first ultrasonic flow meter is operably attached to the branch pipe run.

In addition to one or more of the features described above, or as an alternative, further embodiments may include: determining, using the monitoring system, that the sprinkler head has been activated when the first flow rate is greater than zero.

In addition to one or more of the features described above, or as an alternative, further embodiments may include: activating, using the monitoring system, an alarm when it is determined that the sprinkler head has been activated.

In addition to one or more of the features described above, or as an alternative, further embodiments may include that the alarm indicates a location of the activation zone of the sprinkler head.

In addition to one or more of the features described above, or as an alternative, further embodiments may include: detecting a second flow rate of fire suppressant through the pipe run using a second ultrasonic flow meter operably attached to the pipe run down stream of the first ultrasonic flow meter; and receiving, using the monitoring system, the second flow rate from the second ultrasonic flow meter.

In addition to one or more of the features described above, or as an alternative, further embodiments may include: determining, using the monitoring system, that a leak has occurred in the pipe run between the first ultrasonic flow meter and the second ultrasonic flow meter when the first flow rate does not equal the second flow rate.

In addition to one or more of the features described above, or as an alternative, further embodiments may include: activating, using the monitoring system, an alarm when it is determined that the leak has occurred.

In addition to one or more of the features described above, or as an alternative, further embodiments may include that the alarm indicates a location of the leak.

In addition to one or more of the features described above, or as an alternative, further embodiments may include: determining, using the monitoring system, that the sprinkler head and any other sprinkler head in the fire sprinkler system has not been activated.

Technical effects of embodiments of the present disclosure include incorporating multiple ultrasonic flow meters into pipe runs of fire sprinkler systems to identify sprinkler head activation and detect leaks in the pipe runs of the fire sprinkler systems.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1A:
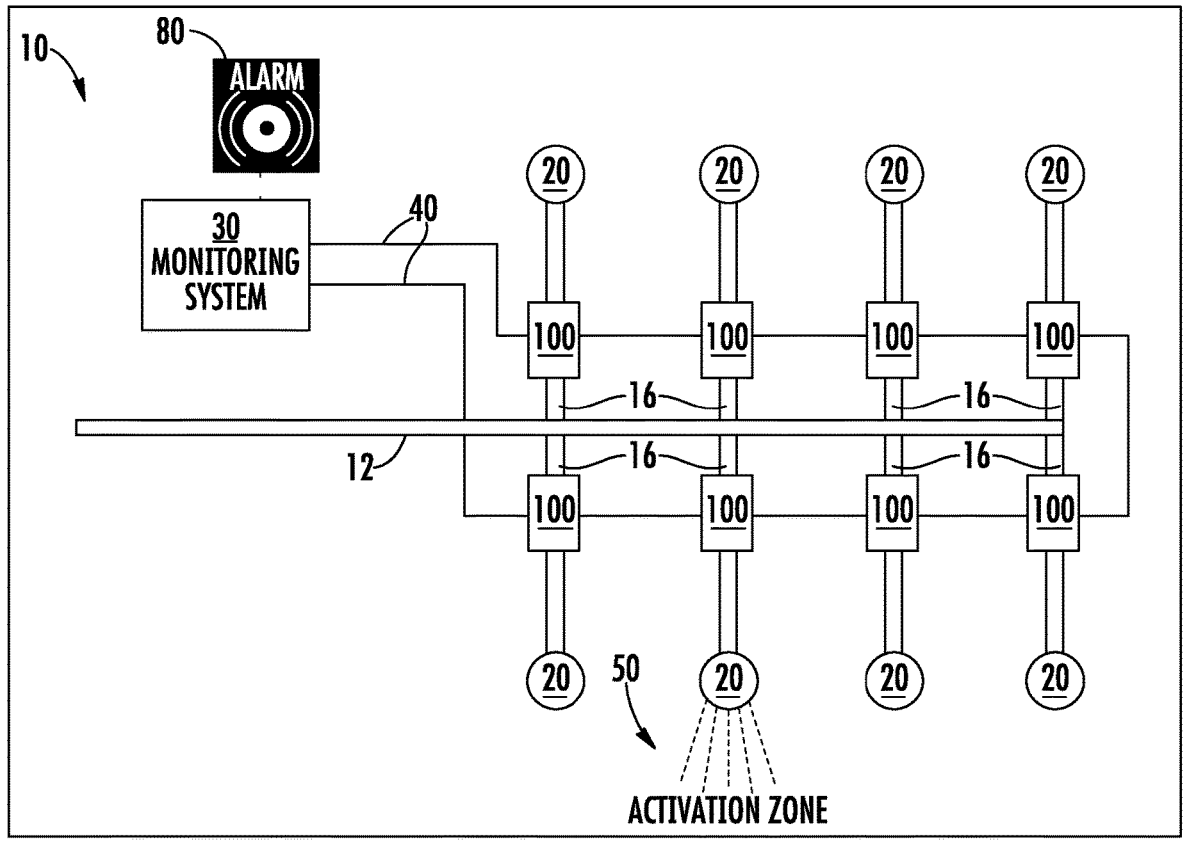
FIG. 1a is a schematic illustration of a fire sprinkler system, in accordance with an embodiment of the disclosure.
Figure 1B:
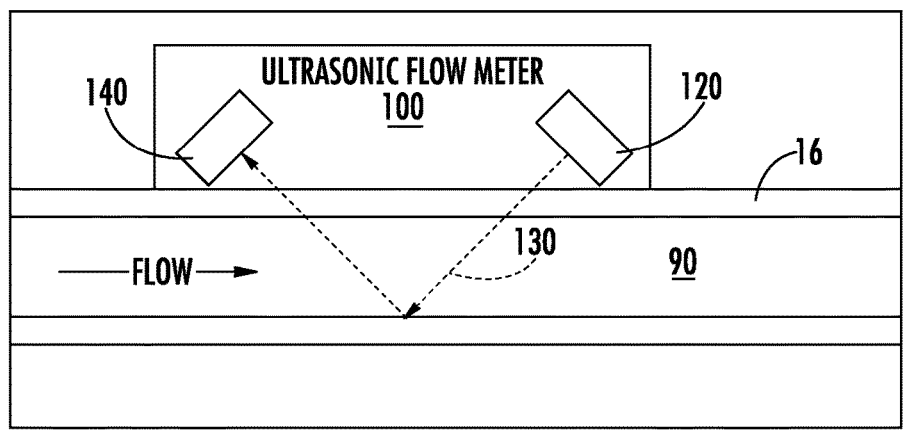
FIG. 1b is an enlarged schematic illustration of an ultrasonic flow meter of the fire sprinkler system of FIG. 1a, in accordance with an embodiment of the disclosure.

Referring now to FIGS. 1a and 1b, FIG. 1a shows a schematic illustration of a fire sprinkler system 10, according to an embodiment of the present disclosure. The fire sprinkler system 10 comprises one or more pipe runs 12, 16, one or more sprinkler heads 20 fluidly connected to the one or more pipe runs 12, 16, one or more ultrasonic flow meters 100 operably attached to each of the one or more pipe runs 12, 16, and a monitoring system 30 in electronic communication with each of the one or more ultrasonic flow meters 100. The one or more pipe runs 12, 16 includes a common pipe run 12 that distributes a flow of fire suppressant 90 to one or more branch pipe runs 16 fluidly connected to the common pipe run 12. In an embodiment the fire suppressant 90 may be water. It is understood that while FIG. 1a includes eight ultrasonic flow meters 100 the fire sprinkler system 10 may contain any number of ultrasonic flow meters 100 depending upon the number and organization of pipe runs 12, 16. The ultrasonic flow meter 100 is configured to detect a flow rate of fire suppressant 90 flowing through the pipe runs 12, 16. The ultrasonic flow meter 100 may detect the flow rate of fire suppressant 90 by transmitting from a transmitter 120 an ultrasonic sound wave 130, which is then received by a receiver 140, as shown in FIG. 1b. The flow rate of the fire suppressant 90 may then be determined by the amount of interference that the fire suppressant 90 imparts upon the ultrasonic sound wave 130. The ultrasonic flow meter 100 may be a time transit flow meter, a Doppler shift flow meter, and/or an open channel flow meter. Advantageously, an ultrasonic flow meter 100 does not interfere with the flow rate of the fire suppressant 90 through the pipe runs 12, 16, since the ultrasonic flow meter is not within the pipe run 12, 16.

As shown in FIG. 1a, an ultrasonic flow meter 100 may be located in each of the branch pipe runs 16. Advantageously, by locating an ultrasonic flow meter 100 in each of the branch pipe runs 16, when a specific sprinkler head 20 is activated in an activation zone 50, the ultrasonic flow meter 100 located on the branch pipe run 16 of the sprinkler head 20 in the activation zone 50 will detect a flow rate of fire suppressant 90.

When an ultrasonic flow meter 100 detects the flow rate of fire suppressant 90, the flow rate may be transmitted from the ultrasonic flow meter 100 to the monitoring system 30 via the communication channels 40. The communication channel 40 allows for communication between each of the one or more ultrasonic flow meters 100 and the monitoring system 30. This communication between each of the one or more ultrasonic flow meters 100 and the monitoring system 30 may be wired and/or wireless.

The monitoring system 30 may include a processor and an associated memory. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium. The monitoring system 30 may activate an alarm 80 when the flow rate greater than zero is detected in at least one of the branch pipe runs 16. The alarm 80 may be audible, vibratory, and/or visual. The alarm 80 may indicate a location of an activation zone 50 where the flow rate of fire suppressant 90 was detected.

Figure 2A:
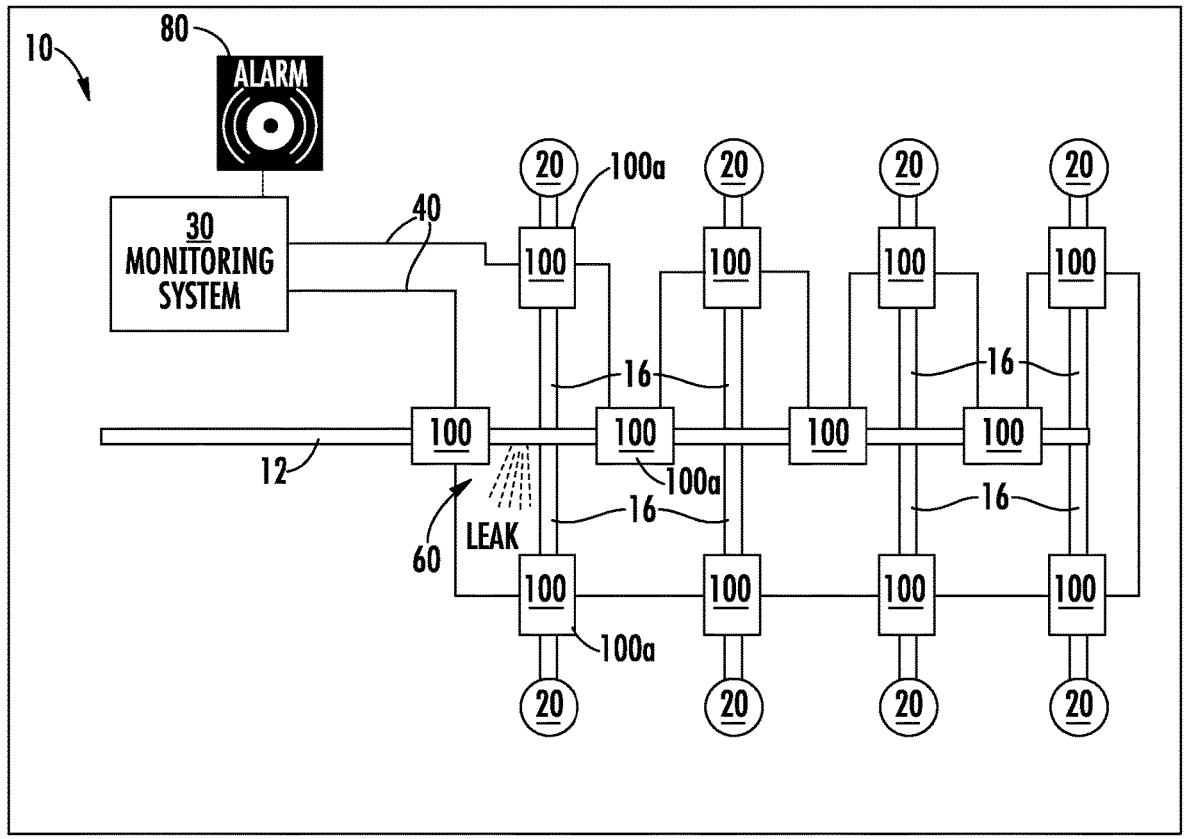
FIG. 2a is a schematic illustration of a fire sprinkler system, in accordance with an embodiment of the disclosure.
Figure 2B:
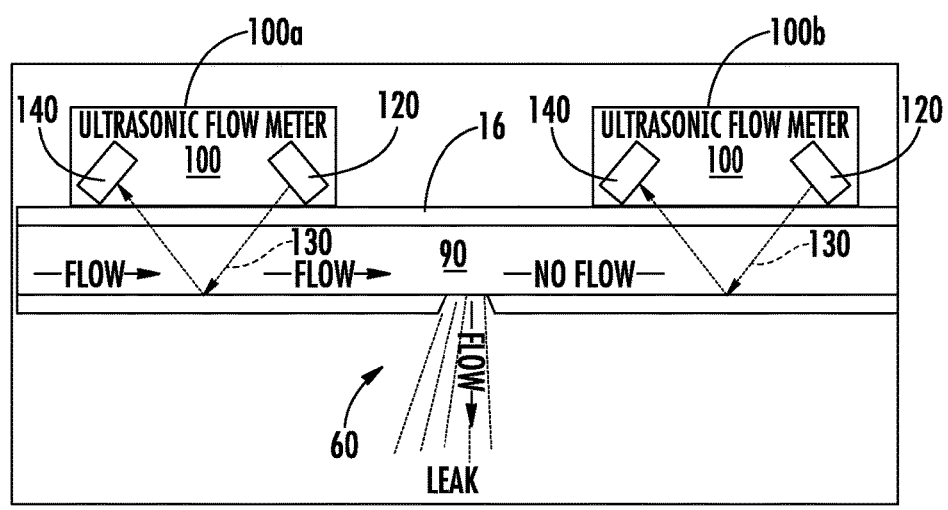
FIG. 2b is an enlarged schematic illustration of a first ultrasonic flow meter and a second ultrasonic flow meter of the fire sprinkler system of FIG. 2a, in accordance with an embodiment of the disclosure.

Referring now to FIGS. 2a and 2b, FIG. 2a shows a schematic illustration of a fire sprinkler system 10, according to an embodiment of the present disclosure. The fire sprinkler system 10 comprises one or more pipe runs 12, 16, one or more sprinkler heads 20 fluidly connected to the one or more pipe runs 12, 16, one or more ultrasonic flow meters 100 operably attached to each of the one or more pipe runs 12, 16, and a monitoring system 30 in electronic communication with each of the one or more ultrasonic flow meters 100. The one or more pipe runs 12, 16 includes a common pipe run 12 that distributes a flow of fire suppressant 90 to one or more branch pipe runs 16 fluidly connected to the common pipe run 12. In an embodiment the fire suppressant 90 may be water. It is understood that while FIG. 2a includes twelve ultrasonic flow meters 100 the fire sprinkler system 10 may contain any number of ultrasonic flow meters 100 depending upon the number and organization of pipe runs 12, 16. The ultrasonic flow meter 100 is configured to detect a flow rate of fire suppressant 90 flowing through the pipe runs 12, 16. The ultrasonic flow meter 100 may detect the flow rate of fire suppressant 90 by transmitting from a transmitter 120 an ultrasonic sound wave 130, which is then received by a receiver 140, as shown in FIG. 2b. The flow rate of the fire suppressant 90 may then be determined by the amount of interference that the fire suppressant 90 imparts upon the ultrasonic sound wave 130. The ultrasonic flow meter 100 may be a time transit flow meter, a Doppler shift flow meter, and/or an open channel flow meter. Advantageously, an ultrasonic flow meter 100 does not interfere with the flow rate of the fire suppressant 90 through the pipe runs 12, 16, since the ultrasonic flow meter is not within the pipe run 12, 16.

As shown in FIG. 2a, an ultrasonic flow meter 100 may be located in each of the branch pipe runs 16 and in multiple locations along the common pipe run 12. Advantageously, by locating an ultrasonic flow meter 100 in each of the branch pipe runs 16 and in multiple locations along the common pipe run 12, when a leak 60 occurs in the pipe run 12, 16, the ultrasonic flow meter 100 located on either side of the leak 60 will detect a different flow rate of fire suppressant 90.

In an example, the fire sprinkler system 10 may include a first ultrasonic flow meter 100a and a second ultrasonic flow meter 100b, as shown in FIGS. 2a and 2b. The second ultrasonic flow meter 100b may be located downstream of the first ultrasonic flow meter 100a in the pipe runs 12, 16. The first ultrasonic flow meter 100a may detect a first flow rate and the second ultrasonic flow meter 100b may detect a second flow rate. When the first flow rate does not match the second flow rate, it may indicate that there is a leak between the first ultrasonic flow meter 100a and the second ultrasonic flow meter 100b.

When an ultrasonic flow meter 100 detects the flow rate of fire suppressant 90, the flow rate may be transmitted from the ultrasonic flow meter 100 to the monitoring system 30 via the communication channels 40. The communication channel 40 allows for communication between each of the one or more ultrasonic flow meters 100 and the monitoring system 30. This communication between each of the one or more ultrasonic flow meters 100 and the monitoring system 30 may be wired and/or wireless. The monitoring system 30 is configured to analyse each of the flow rates being detected by the one or more flow meters 100 and determine where a leak may exist when the one or more flow rates do not match.

The monitoring system 30 may include a processor and an associated memory. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium. The monitoring system 30 may activate an alarm 80 when a difference in flow rates is detected between two ultrasonic flow meters of the branch pipe runs 16, which may be indicative of a leak. The alarm 80 may be audible, vibratory, and/or visual. The alarm 80 may indicate a location of the potential leak 60 where flow rate discrepancy of fire suppressant 90 was detected.

Figure 3:
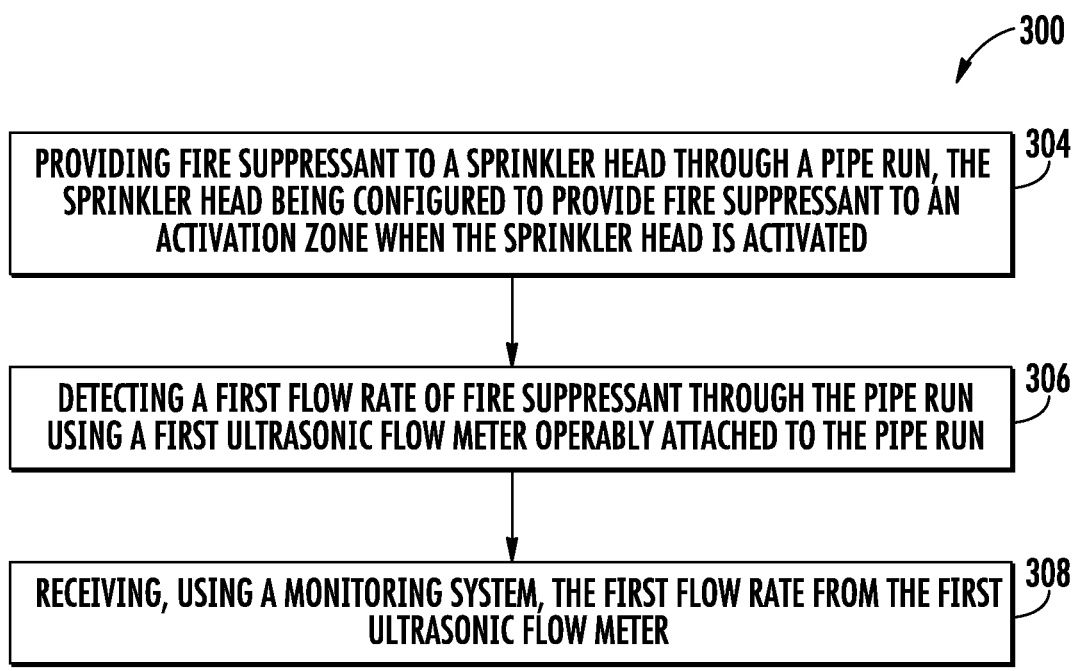
FIG. 3 is a flow diagram illustrating a method of monitoring a flow rate of fire suppressant in a fire sprinkler system, according to an embodiment of the present disclosure.

Referring now also to FIG. 3 with continued reference to FIGS. 1-2. FIG. 3 shows a flow diagram illustrating a method 300 of monitoring a flow rate of fire suppressant 90 in a fire sprinkler system 10. At block 304, fire suppressant 90 is provided to a sprinkler head 20 through a pipe run 12, 16. As mentioned above, the sprinkler head 20 is configured to provide fire suppressant 90 to an activation zone 50 when the sprinkler head 20 is activated. At block 306, a first flow rate of fire suppressant 90 through the pipe run 12, 16 is detected using a first ultrasonic flow meter 100a operably attached to the pipe run 12, 16. The first ultrasonic flow meter 100a is configured to transmit the first flow rate to a monitoring system 30. At block 308, the monitoring system 30 receives the first flow rate from the first ultrasonic flow meter 100a.

In the example of FIGS. 1a and 1b, where the pipe run 12, 16 further comprises a common pipe run 12 and a branch pipe run 16 fluidly connected the sprinkler head 20 to the common pipe run 16 and the first ultrasonic flow meter 100a is operably attached to the branch pipe run, the method 300 may further comprise: determining, using the monitoring system 20, that the sprinkler head 20 has been activated when the first flow rate is greater than zero. For example, when there is no movement (i.e. first flow rate=zero) of fire suppressant 90 through the branch pipe run 16, then it may be determined that the sprinkler head 20 attached to that branch pipe run 16 is not activated. The monitoring system 20 may activate an alarm 80 when it is determined that the sprinkler head 20 has been activated. Further, the alarm 80 may indicate the location of the activation zone 60 of the sprinkler head 20 that has been activated.

In the example of FIGS. 2a and 2b, the method 300 may further comprise that a second ultrasonic flow meter 100b may detect a second flow rate of fire suppressant 90 through the pipe run 12, 16. As mentioned above, the second ultrasonic flow meter 100b is operably attached to the pipe run 12, 16 downstream of the first ultrasonic flow meter 100a. The second ultrasonic flow meter 100b may then transmit the second flow rate to the monitoring system 30, which may then determine that a leak 60 has occurred in the pipe run 12, 16 between the first ultrasonic flow meter 100a and the second ultrasonic flow meter 100b when the first flow rate does not equal the second flow rate. The monitoring system 30 may also confirm that the discrepancy in flow rate is a leak by determining that none of the sprinkler heads 20 of the fire sprinkler system have been activated.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fire sprinkler system comprising:
   a first sprinkler head configured to provide fire suppressant to first activation zone when the first sprinkler head is activated;
   a second sprinkler head configured to provide fire suppressant to a second activation zone when the second sprinkler head is activated;
   a pipe run fluidly connected to the first sprinkler head and second sprinkler head, the pipe run configured to provide fire suppressant to the first sprinkler head and the second sprinkler head, the pipe run further comprising a common pipe run, a first branch pipe run fluidly connecting the first sprinkler head to the common pipe run at a first location, and a second branch pipe run fluidly connecting the second sprinkler head to the common pipe run at a second location;
   a first ultrasonic flow meter operably attached to the first branch pipe run, the first ultrasonic flow meter being configured to detect a first flow rate of fire suppressant through the first branch pipe run;
   a second ultrasonic flow meter operably attached to the common pipe run between the first location and the second location, the second ultrasonic flow meter being configured to detect a second flow rate of fire suppressant through the common pipe run between the first location and the second location;
   a third ultrasonic flow meter operably attached to the second branch pipe run, the third ultrasonic flow meter being configured to detect a third flow rate of fire suppressant through the second branch pipe run; and
   a monitoring system in electronic communication with the first ultrasonic flow meter, the second ultrasonic flow meter, and the third ultrasonic flow meter, the monitoring system being configured to receive the first flow rate from the first ultrasonic flow meter, the second flow rate from the second ultrasonic flow meter, and the third flow rate from the third ultrasonic flow meter.

2. The fire sprinkler system of claim 1, wherein:
   the monitoring system is configured to determine that the first sprinkler head has been activated when the first flow rate is greater than zero.

3. The fire sprinkler system of claim 2, wherein:
   the monitoring system is configured to activate an alarm when it is determined that the first sprinkler head has been activated.

4. The fire sprinkler system of claim 3, wherein:
   the alarm indicates a location of the first activation zone of the first sprinkler head.

5. The fire sprinkler system of claim 1, wherein:
   the monitoring system is configured to determine that a leak has occurred in the pipe run between the first ultrasonic flow meter and the second ultrasonic flow meter when the first flow rate does not equal the second flow rate.

6. The fire sprinkler system of claim 5, wherein:
   the monitoring system is configured to activate an alarm when it is determined that the leak has occurred.

7. The fire sprinkler system of claim 6, wherein:
   the alarm indicates a location of the leak.

8. The fire sprinkler system of claim 1, wherein:
   the monitoring system is configured to determine that the first sprinkler head and any other sprinkler head in the fire sprinkler system has not been activated.

9. A method of monitoring a flow rate of fire suppressant in a fire sprinkler system, the method comprising:
   providing fire suppressant to a first sprinkler head through a pipe run, the first sprinkler head being configured to provide fire suppressant to an first activation zone when the first sprinkler head is activated;
   providing fire suppressant to a second sprinkler head through a pipe run, the second sprinkler head being configured to provide fire suppressant to a second activation zone when the second sprinkler head is activated, wherein the pipe run further comprises a common pipe run, a first branch pipe run fluidly connecting the first sprinkler head to the common pipe run at a first location, and a second branch pipe run fluidly connecting the second sprinkler head to the common pipe run at a second location, and;
   detecting a first flow rate of fire suppressant through the first branch pipe run using a first ultrasonic flow meter operably attached to the branch pipe run;
   detecting a second flow rate of fire suppressant through the common pipe run between the first location and the second location using a second ultrasonic flow meter operably attached to the common pipe run between the first location and the second location;
   detecting a third flow rate of fire suppressant through the second branch pipe run using a third ultrasonic flow meter operably attached to the second branch pipe run; and
   receiving, using a monitoring system, the first flow rate from the first ultrasonic flow meter, the second flow rate from the second ultrasonic flow meter, and the third flow rate from the third ultrasonic flow meter.

10. The method of claim 9, further comprising:
determining, using the monitoring system, that the first sprinkler head has been activated when the first flow rate is greater than zero.

11. The method of claim 10, further comprising:
activating, using the monitoring system, an alarm when it is determined that the first sprinkler head has been activated.

12. The method of claim 11, wherein:
the alarm indicates a location of the first activation zone of the first sprinkler head.

13. The method of claim 9, further comprising:
determining, using the monitoring system, that a leak has occurred in the pipe run between the first ultrasonic flow meter and the second ultrasonic flow meter when the first flow rate does not equal the second flow rate.

14. The method of claim 13, further comprising:
activating, using the monitoring system, an alarm when it is determined that the leak has occurred.

15. The method of claim 14, wherein:
the alarm indicates a location of the leak.

16. The method of claim 9, further comprising:
determining, using the monitoring system, that the first sprinkler head and any other sprinkler head in the fire sprinkler system has not been activated.

* * * * *